United States Patent [19]

Glover

[11] Patent Number: 4,611,994
[45] Date of Patent: Sep. 16, 1986

[54] ARTIST'S SKETCHING DEVICE

[76] Inventor: Henry Glover, 3571 Zumstein Ave., Cincinnati, Ohio 45208

[21] Appl. No.: 735,760

[22] Filed: May 20, 1985

[51] Int. Cl.[4] .................................. G09B 11/04
[52] U.S. Cl. ......................................... 434/85
[58] Field of Search ............... 434/85, 88, 89, 90, 434/91, 92

[56] References Cited

U.S. PATENT DOCUMENTS

| 151,965 | 6/1874 | Forbriger . |
| 574,605 | 1/1897 | Heiles . |
| 726,141 | 4/1903 | Chester . |
| 1,415,833 | 5/1922 | Ginsburg . |
| 1,646,868 | 10/1927 | Newlands et al. . |
| 2,418,286 | 4/1947 | Auston . |
| 2,626,467 | 1/1953 | Abbott . |
| 3,086,296 | 4/1963 | Bergstrom . |
| 3,605,287 | 9/1971 | Jonesi . |
| 3,660,903 | 5/1972 | Caperton ............... 434/90 X |
| 4,439,159 | 3/1984 | Hunter ..................... 434/85 |

FOREIGN PATENT DOCUMENTS 335064 9/1930 United Kingdom ............... 434/90

Primary Examiner—Harland S. Skogquist
Attorney, Agent, or Firm—Wood, Herron & Evans

[57] ABSTRACT

An artist's sketching device wherein a sketch pad is bound to an oversized back which presents a rectangular viewing window positioned directly above the pad. The height and width of the window are in the same approximate proportion to one another as the corresponding dimensions of the sketch pad.

6 Claims, 2 Drawing Figures

ARTIST'S SKETCHING DEVICE

FIELD OF THE INVENTION

This invention relates to a combined viewing device and sketching pad for use by artists.

BACKGROUND

It is known to provide artist's viewers presenting a frame or window which, when the scene to be drawn is viewed through it, assists the artist in drawing that scene. Such devices are shown in the U.S. patents to Newlands, U.S. Pat. No. 1,646,868; Austin U.S. Pat. No. 2,418,286; and Bergstrom U.S. Pat. No. 3,086,296. However, those devices are relatively complex, expensive and hard to use, especially for beginning artists. Moreover, they are not sized to fit in the pocket and require a table or easel to support the sketch pad, as a result of which they are confined to limited use.

SUMMARY OF THE INVENTION

The objective of this invention is to provide a sketching device which will assist persons untrained in art, particularly school children, in learning to draw natural objects. The invention is premised upon the concept that the basic act of drawing is a beneficial learning and creative process in and of itself, apart from whatever drawing skills may ultimately be acquired. The invention is further based on the concept that the process of learning to draw is greatly assisted by a simple sketching pad and viewer which can be carried in a jacket or pocket and used without an easel.

In accordance with this invention, a combined artist's sketch pad and viewfinder is provided, having a rigid back member which is rectangular in shape. A pad or book of sketching paper is bound to the back along a side (vertical) edge of the back. The pad is shorter in height than the back, and is mounted on what is the lower portion of the back, as viewed when the back is held upright. The back is thus oversized with respect to the pad, and in its top portion, above the pad, a rectangular window is provided which forms a viewfinder. The dimensions of this window are proportioned to those of the pages of the pad. A pencil or other sketching implement is mounted to the back, preferably between the pad and the window. The device thus provides a self-contained support, sketching pad, viewing window and drawing implement.

The position of the window, which is close to and in the same plane as the pad, enhances peripheral vision and allows better translation of the scene to the paper. The artist, while looking directly at the scene through the viewfinder, can see his drawing just below the window, with peripheral vision, so as to compare the two; and conversely, he can see the scene peripherally through the window while concentrating on the drawing.

DESCRIPTION OF THE DRAWINGS

The invention can best be further described by reference to the accompanying drawing in which.

DETAILED DESCRIPTION

Figure 1:
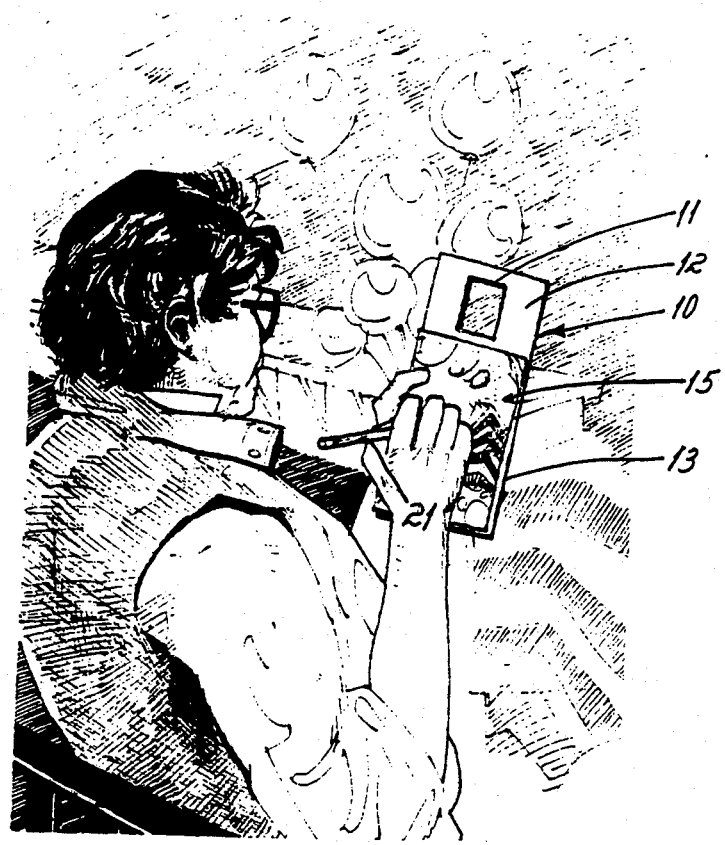
FIG. 1 is a perspective view illustrating the manner in which my invention is used.
Figure 2:
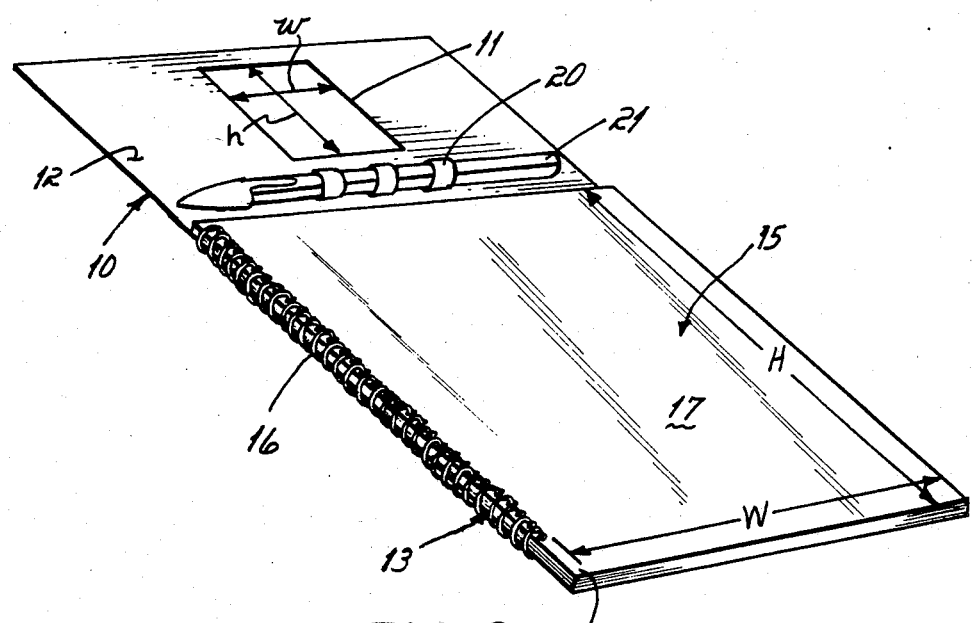
FIG. 2 is a perspective view of a preferred embodiment of the invention.

In preferred form the sketching device of this invention includes a rigid rectangular base or back 10, which may be formed of double thickness cardboard. A viewing window 11 is centered in the top part 12 of the back. This window has a height h and a width w.

Mounted to the other or bottom part 13 of the back 10 is a sketch book 15 comprising a series of sheets and a cover 17. The sheets and cover are bound together and to the back 10 along the left edge 18. The binder may be a continuous spiral wire binder 16 as shown, or alternatively it may be a flexible, expansible plastic binder. The top cover 17 is of cardboard and is sufficiently rigid that when open, the cover will support the left hand pages while the back supports the right hand pages.

The individual pages of the pad are of height H and width W (as measured to the binding). The ratio H/W of the pad is approximately the same as the ratio h/w for the window. Where, for example, the pages of the pad are 5½ inches high and 3¾ inches wide, the window may be about 2 inches high by 1½ inches wide (H/W=1.47; h/w=1.33). For this size page, the back 10 can for example be 4" wide by 8½ inches high.

A means 20 for securing a drawing instrument 21, such as a pen, pencil or the like, is preferably mounted to base 10 above pad 15 and just below window 11. While any type of holder can be used, I have found that a short length of expansible, flexible binder can be adhesively secured to the back and provides an effective holder for the drawing implement. The pen or pencil can be inserted axially down the center of the binder; the binder expands to grip and hold it.

The pages of the pad can be grey or, preferably, white, and the back a darker grey. The drawing implement can be a black ballpoint pen, a conventional drawing pencil, or a two-headed pencil having one white end and one black end which, with grey pages, provides a three-color system.

In use the student first holds the device upright in front of him and views the scene to be drawn through the window. He can then draw the scene on the pad, which is supported by the back. The proximity of the viewer and the pad facilitates frequent and convenient use of the viewer. Framing and proportioning on the pad are greatly assisted by observing relative sizes and positions within the window, because the window is proportioned similarly to the pad.

Having described the invention, what is claimed is:

1. An artist's sketching device comprising,
   a rigid rectangular back,
   a pad of bound sheets of drawing paper secured to and supported on a lower portion of said back,
   a rectangular viewing window formed through an upper portion of said back directly above said pad, said window having a height-to-width ratio approximately equal to the corresponding ratio of the sheets in said pad, and
   means on said back for holding a drawing implement.

2. The sketching device of claim 1 further including a rigid cover sheet for said pad, said cover sheet supporting at least some of the sheets of the pad when the pad is open.

3. The sketching device of claim 1 wherein the sheets of said pad are bound together and to said back along a side edge of the back.

4. The sketching device of claim 3 wherein said sheets are bound together and to said back by a continuous spiral wire binder.

5. The sketching device of claim 4 wherein said means for holding said drawing implement comprises an exandable flexible ring binder, said implement being insertable axially into the latter binder.

6. The sketching device of claim 1 wherein said sheets of paper are grey or white and said implement is a black ballpoint pen or a double-ended pencil having one white and and one black end.

* * * * *